United States Patent [19]
Beyda et al.

[11] Patent Number: 6,058,111
[45] Date of Patent: May 2, 2000

[54] SYSTEM AND METHOD FOR PROVIDING A DROPPABLE SWITCHED CIRCUIT

[75] Inventors: William J. Beyda, Cupertino; Shmuel Shaffer, Palo Alto, both of Calif.

[73] Assignee: Siemens Information and Communication Networks, Inc., Boca Raton, Fla.

[21] Appl. No.: 08/878,475

[22] Filed: Jun. 18, 1997

[51] Int. Cl.[7] .......................... H04L 12/50; H04Q 11/00; H04J 3/02
[52] U.S. Cl. ............................................. 370/360; 370/462
[58] Field of Search ..................................... 370/352, 354, 370/357, 358, 359, 360, 376, 384, 355, 401, 230, 232, 233, 235, 399, 229, 386, 387, 217, 219, 220; 379/208, 115, 219, 220, 221, 229

[56] References Cited

U.S. PATENT DOCUMENTS

Re. 32,900   4/1989   Orsic ........................................ 370/359
4,819,230    4/1989   Calvignac et al. ....................... 370/354
4,962,497   10/1990   Ferenc et al. ............................ 370/354
5,179,552    1/1993   Chao ........................................ 370/352
5,251,206   10/1993   Calvignac et al. ....................... 370/352
5,483,524    1/1996   Lev et al. ................................. 370/355
5,528,664    6/1996   Slekys et al. ............................ 370/329
5,592,477    1/1997   Farris et al. ............................. 370/401
5,600,643    2/1997   Robrock, II .............................. 370/399

*Primary Examiner*—Hassan Kizou
*Assistant Examiner*—Afsar M. Qureshi

[57] ABSTRACT

A circuit switched system is provided wherein user devices (1000) are able to identify a particular communication as having a higher or lower level of priority. The lower priority level channels are identified as being "droppable." If during a communication on a particular channel another user device desires communication which would require use of the already used channel (3000) a network supervisor (100) determines whether or not the previously used channel is identified as being droppable. If the currently used channel is identified as being droppable, the network supervisor (100) is configured to cause the channel transmission to end and to allow the establishment of the subsequent channel.

12 Claims, 9 Drawing Sheets

SYSTEM AND METHOD FOR PROVIDING A DROPPABLE SWITCHED CIRCUIT

BACKGROUND OF THE INVENTION

This invention relates to circuit switching systems and more particularly to an enhanced circuit switching system in which a secondary class of switched circuits is used for lower priority traffic and assigned to droppable circuits.

DESCRIPTION OF THE RELATED ART

Circuit switching is a method of network switching wherein a dedicated circuit, for example, a physical path from transmitter to receiver, or a particular time slot on such physical path, is established before and maintained throughout each communication. By contrast, with a packet switched system, the channel is not dedicated and is available for use by multiple sources and destinations.

One advantage of packet switching versus circuit switching is that packet switching technologies such as ATM (asynchronous transfer mode) allow prioritization of certain information versus other information. For example, less critical data can be made to wait behind higher priority data. Thus, predetermined network bandwidth can be reserved according to priority levels. Nevertheless, advanced packet switching techniques require a relatively large amount of software overhead to maintain a reservation protocol.

While packet switching technologies such as ATM are making inroads into the telecommunications infrastructure circuit switched technology still forms a large percentage of the telecommunications infrastructure. However, circuit switched systems are underutilized, since they are configured to prevent calls from being made at certain times to avoid congestion.

Accordingly, it is desirable to provide a circuit switched system which maintains the advantages of circuit switching while at the same time can provide for prioritization of traffic without the overhead required with packet switching.

SUMMARY OF THE INVENTION

These difficulties in the prior art are overcome in large part by a system and method for providing a droppable switched circuit according to the present invention. According to one embodiment of the present invention a circuit switched system is provided wherein user devices are able to identify a particular communication as having a higher or lower level of priority. The lower priority level channels are identified as being "droppable." If, during a communication on a particular channel, another user device desires communication which would require use of the already-used channel, a network supervisor determines whether or not the previously-used channel is identified as being droppable. If the currently used channel is identified as being droppable, the network supervisor is configured to cause the channel transmission to end and to allow the establishment of the subsequent channel.

A method according to one embodiment of the present invention includes establishing a circuit switched connection from a first node to a second node. The method further comprises monitoring network utilization and channel configurations. The method finally includes dropping the circuit switched connection responsive to a determination that the circuit switched connection is of a lower priority than another circuit switched connection.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
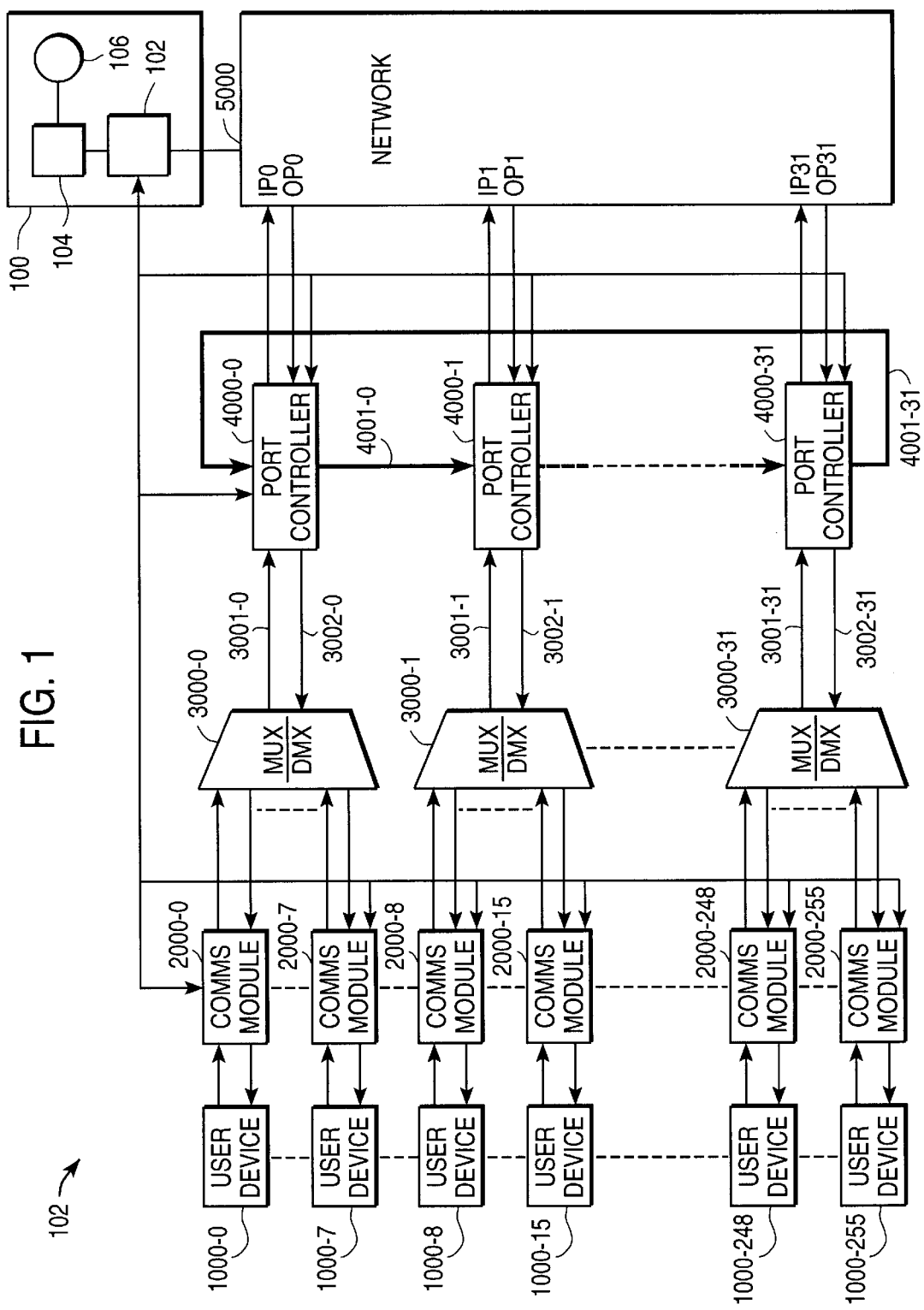
FIG. 1 is a block diagram of an illustrative circuit switching system according to the present invention.

FIG. 1 is a block diagram of an illustrative circuit switching system used for data communication among 256 user devices 1000-0 through 1000-255 representing any of a wide variety of devices including telephones, computers, PBX's and the like. Each user device 1000-0 through 1000-255 interfaces with the system via an associated one of 256 communications modules 2000-0 through 2000-255. Each communication module, in turn, is coupled to a network supervisor 100, which is configured to monitor activity of the circuit switching system. Network supervisor 100 includes a user interface 102, a control processor 104, and a storage device 106.

Figure 2A:
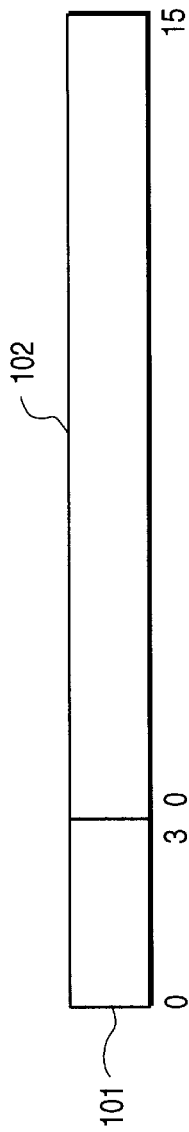
FIG. 2a, FIG. 2b and FIG. 2c represent digital word formats used on high speed communication links included in the system of FIG. 1.

According to the present invention, each user device is configured to request a priority level when initiating communication. The priority level indicates whether a particular circuit connection is "droppable." More particularly, user devices are configured to request a circuit connection using the data word format of FIG. 2a. Data word 101 identifies a priority level. Though shown in an exemplary embodiment as having four bits, any predetermined number of bits may be used. Data word 102 represents the identification of the destination link and destination channel, as will be described in greater detail below.

This information, as well as information concerning the circuit path, is provided to the network supervisor 100, read by the control processor 104 and stored in the memory device 106. During the connection, another user may make a request for communication. The request information is provided to the network supervisor 100. The control processor 104 compares the desired circuit path with those already established. Network supervisor 100 may determine that the request would require the same circuit path. In that case, the control processor 104 of network supervisor 100 reads that the existing circuit is droppable, and drops the circuit to allow the higher priority connection. Control processor 104 may store a plurality of priority levels in the storage device 106. Only if the "new" connection is of higher priority than an existing one will the existing connection be dropped.

In addition, the control processor 104 may be configured to monitor the desired length of each communication. If the existing communication is nearly at an end (as defined, for example, by a predetermined number of bytes remaining), the control processor may allow the existing connection to finish before the higher priority one begins.

The control processor 104 may further be configured to prevent calls having a low priority level from being made at all if it determines that the network is already overburdened. In this case, a predetermined threshold may be input and stored in storage device 106. The control processor 104 compares the threshold with the existing network utilization. If the communication request is of low priority, the connection will not be made.

More generally, information transmitted by eight of the communications modules 2000-0 through 2000-7 is multiplexed by multiplexer/demultiplexer 3000-0 onto eight time-multiplexed source channels 0 through 7 of a high speed communications link 3001-0, e.g., a fiber optic link, for transmission to a port controller 4000-0. Similarly, the information transmitted by the other communications modules 2000-8 though 2000-255 is multiplexed by multiplexer/demultiplexers 3000-1 through 3000-31 onto time-multiplexed source channels 0 through 7 of high speed communications links 3001-1 through 3001-31 to port controllers 4000-1 through 4000-31. Information is conveyed among the port controllers 4000-0 through 4000-31 by a switching network 5000. Port controller 4000-0 transmits information received from network 5000, in eight time-multiplexed destination channels 0 through 7 on a high speed communications link 3002-0 to multiplexer/demultiplexer 3000-0, which demultiplexes that information for transmission to the eight communications modules 2000-0 through 2000-7. Similarly, port controllers 4000-1 through 4000-31 transmit information received from network 5000, in time-multiplexed destination channels 0 through 7 on high speed communications links 3002-1 through 3002-31 to the multiplexer/demultiplexers 3000-1 though 3000-31, which demultiplex that information for transmission to communications modules 2000-8 through 2000-255. Accordingly, each of the communications modules 2000-0 through 2000-255 is permanently associated with one source channel on one of the 32, eight-channel links 3001-0 through 3001-31 and with one destination channel on one of the 32, eight-channel links 3002-0 through 3002-31.

Figure 2B:
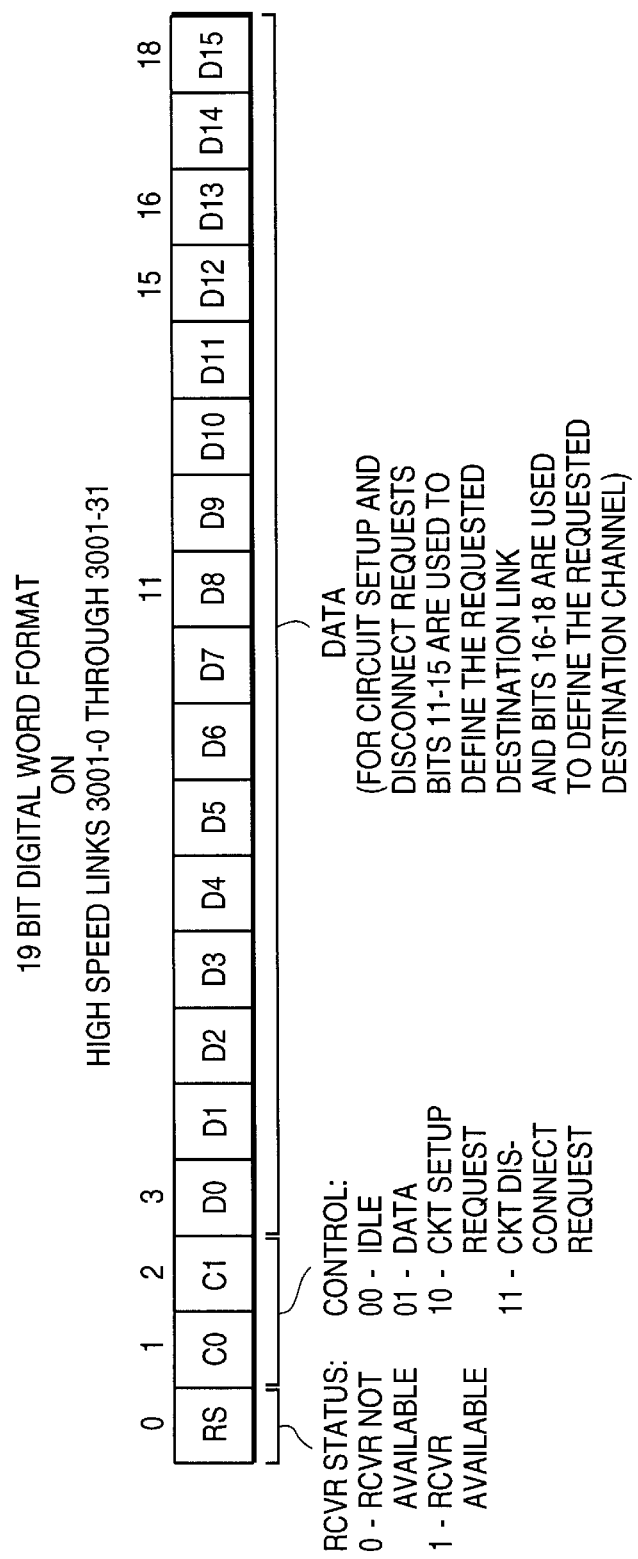

Multiplexer/demultiplexer 3000-0 transmits one 19-bit digital word during each occurrence of a source channel on link 3001-0. The format of the digital words transmitted on links 3001-0 through 3001-31 is shown in FIG. 2*b*. The format includes a receiver status bit used to define the availability of the communications module to receive data in its associated destination channel, a two-bit control field used to define the digital word as an idle word, a data word, a circuit setup request word or a circuit disconnect request word and a 16-bit data field. Further, for circuit setup request words and circuit disconnect request words, five bits of the data field are used to define the requested destination link of the 32 links 3002-0 through 3002-31 and three bits of the data field are used to define the requested destination channel of the eight channels on the requested destination link. Equivalently, those eight data field bits define the requested destination communications module of the 256 communications modules 2000-0 though 2000-255.

Figure 2C:
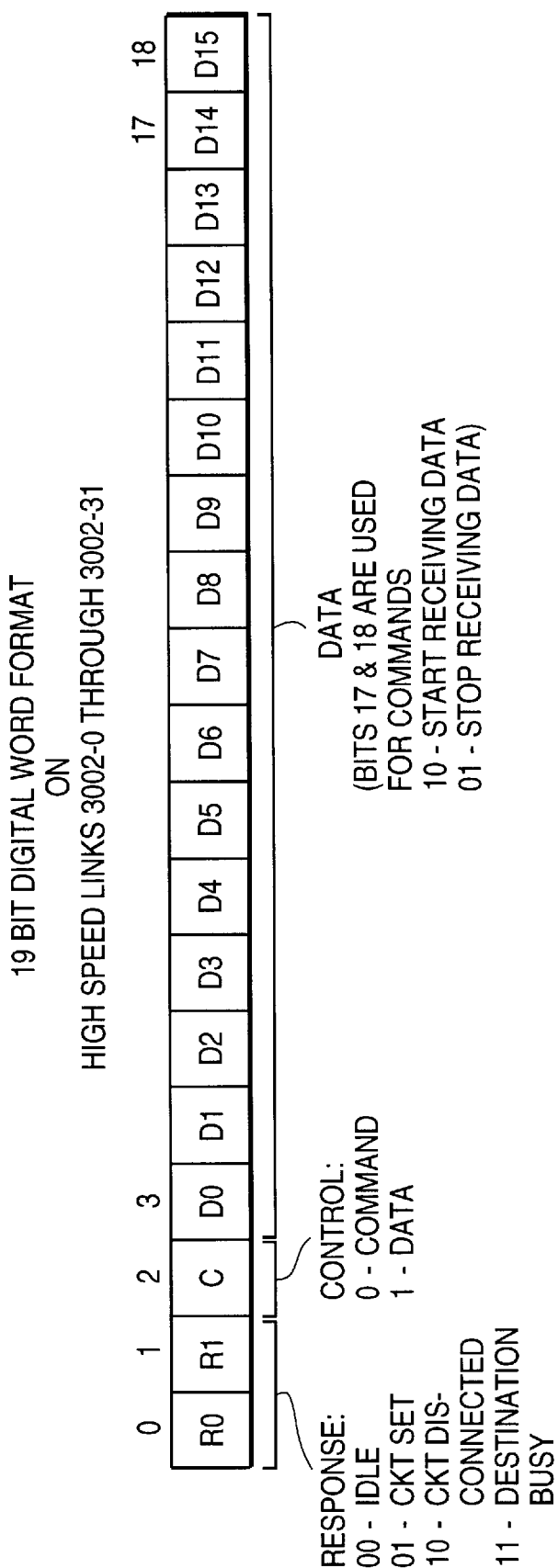

Port controller 4000-0 transmits one 19-bit digital word during each occurrence of a destination channel on link 3002-0. The format of the digital words transmitted on links 3002-0 through 3002-31 is shown in FIG. 2*c*. The format includes a two-bit response field used to transmit responses to circuit setup request words or circuit disconnect request words transmitted by a given communications module. The responses to a circuit setup request word are either a circuit set response or a destination busy response and the response to a circuit disconnect request word is a circuit disconnected response. The format also has a control bit defining the digital word as either a command word or a data word and further includes a 16-bit data field. For command words, two bits of the data field are used to convey the two possible commands, a START RECEIVING DATA command used to command a communications module to begin storing the data words received in its associated destination channel and a STOP RECEIVING DATA command used to command the communications module to stop storing the data words received in its associated destination channel.

The digital words on links 3001-0 through 3001-31, 3002-0 through 3002-31, as well as on the links between the port controllers 4000-0 through 4000-31 and network 5000, further include parity and synchronization bits (not shown) to detect errors and maintain system synchronization, respectively. The use of such bits is well known and is, therefore, not described herein.

Information is conveyed on links 3001-0 through 3001-31 and 3002-0 through 3002-31 in frames each comprising eight time slots or channels. A user device may request communication with another user device. The request includes destination and priority information.

When a given communications module, e.g., 2000-0, receives the request to establish communications with a particular destination communications module, e.g., 2000-248, communications module 2000-0 provides the priority information to the network supervisor 100. In addition, communications module 2000-0 begins transmitting in its associated source channel 0 on link 3001-0 circuit setup request words defining the destination channel associated with communications module 2000-248, i.e., channel 0 of link 3002-31. The port controllers 4000-0 through 4000-31 collectively maintain a database comprising thirty-two, 17-bit status words defining the availability of destination channels and the availability of destination communications modules to receive data. In the one embodiment of the invention, each of the port controllers 4000-0 through 4000-31 stores one of the status words. The status words are repetitively cycled through each of the port controllers 4000-0 through 4000-31 via the transmission paths 4001-0 through 4001-31. Each status word includes eight bits that define the availability of the eight destination channels on one of the links 3002-0 through 3002-31 and eight bits that define the availability of the communications modules associated with those destination channels to receive data. One status word bit is used to define status word 0 among the sequence of 32 status words 0 through 31.

In one embodiment, port controller 4000-0 is only responsive to circuit setup request or circuit disconnect request words received from a given one of the communications modules 2000-0 through 2000-7, during one frame out of each sequence of eight consecutive frames. Port controller 4000-0 responds to one of the circuit setup request words defining destination channel 0 of link 3002-31 by storing that circuit setup request word until status word 31, defining the availability of the destination channels on link 3002-31 and the availability of the communications modules 2000-248 through 2000-255 to receive data, is cycled to port controller 4000-0 to be stored therein. If that status word indicates that either destination channel 0 of link 3002-31 is unavailable or that communications module 2000-248 is presently unavailable to receive data, port controller 4000-0 transmits a destination busy response to communications module 2000-0 which continues to transmit circuit setup request words to attempt to establish communication with communications modules 2000-248. However, if the status word indicates both that destination channel 0 of link 3002-31 is available and that communications module 2000-

248 is available to receive data, port controller 4000-0 transmits a circuit set response to communications module 2000-0 and transmits the stored circuit setup request word to input port IP0 to network 5000. Port controller 4000-0 also modifies status word 31 to define destination channel 0 of link 3002-31 as unavailable and the communications module 2000-248 as unavailable to receive data.

Communications module 2000-0 receives the circuit set response and begins to transmit data words in its associated source channel 0 of link 3001-0 to port controller 4000-0. Port controller 4000-0 also transmits these subsequent data words on to network 5000 input port IP0. Network 5000, which includes eight time-slot interchangers 5100-0 through 5100-7 (FIG. 3), responds to the circuit setup request word by establishing a communication path via network 5000 output port OP31 and port controller 4000-31 to destination channel 0 of link 3002-31 and transmits the circuit setup request word and the subsequent data words thereon. Port controller 4000-31 responds to the circuit setup request word by transmitting a START RECEIVING DATA command followed by the subsequent data words via destination channel 0 of link 3002-31 to communications module 2000-248.

Communications module 2000-248 responds to the START RECEIVING DATA command by storing each data word received in destination channel 0 of link 3002-31 for subsequent transmission to user device 1000-248. Because of the operation of the port controllers 4000-0 through 4000-31 in conjunction with the distributed database of 32 status words, network 5000 only receives circuit setup request words defining destination channels that are available. No data is transmitted until the availability of the destination channel and the availability of the destination communications module are assured.

After communications module 2000-0 has completed its data transmission to communications module 2000-248, communications module 2000-0 begins transmitting circuit disconnect request words defining destination channel 0 of link 3002-31, to port controller 4000-0. Port controller 4000-0 responds to one of the circuit disconnect request words by storing that circuit disconnect request word until status word 31, associated with destination channel 0 of link 3002-31 and communications module 2004-248, is again cycled to port controller 4000-0 for storage therein. Port controller 4000-0 then modifies status word 31 to define destination channel 0 of link 3002-31 as available. Port controller 4000-0 does not, however, modify status word 31 to define communications module 2000-248 as available to receive data. That is left for communications module 2000-248 to do. Port controller 4000-0 then transmits a circuit disconnected response to communications module 2000-0 and transmits the stored circuit disconnect request word on to input port IP0 of network 5000. Network 5000 responds by deallocating the path to destination channel 0 of link 3002-31 but not before the circuit disconnect request word is conveyed thereon to port controller 4000-31. Port controller 4000-31 responds to the circuit disconnect request word by transmitting a STOP RECEIVING DATA command to communications module 2000-248. In response to this command, communications module 2000-248 stops storing the data words received in destination channel 0 of link 3002-31 and transmits the stored data transmission from communications module 2000-0 to user device 1000-248.

Only after communications module 2000-248 has completed its other tasks does it notify port controller 4000-31 that it is again available to receive data. Communications module 2000-248 transmits logic one receiver status bits in the digital words transmitted in source channel 0 of link 3002-31 as a receiver available signal. The next time status word 31 defining the availability of communications module 2000-248 to receive data is cycled to port controller 4000-31, that status word 31 is modified to define communications module 2000-248 as again available to receive data. Only then will a given communications module transmitting circuit setup request words defining communications module 2000-248 be successful in having a network 5000 path established to destination channel 0 of link 3002-31.

According to the present invention, another user may make a request that requires the circuit path currently being used. If so, network supervision 100 determines whether the path was indicated to be droppable. If the connection is not droppable, the new request is held until the previous one is cleared. However, if the existing connection is indicated as being droppable, network supervisor 100 transmits a command to the communications module 2000-0, which set up the connection, to drop the connection. The communications module 2000-0 then issues disconnect request words, and disconnection of the circuit proceeds as described above.

Figure 3:
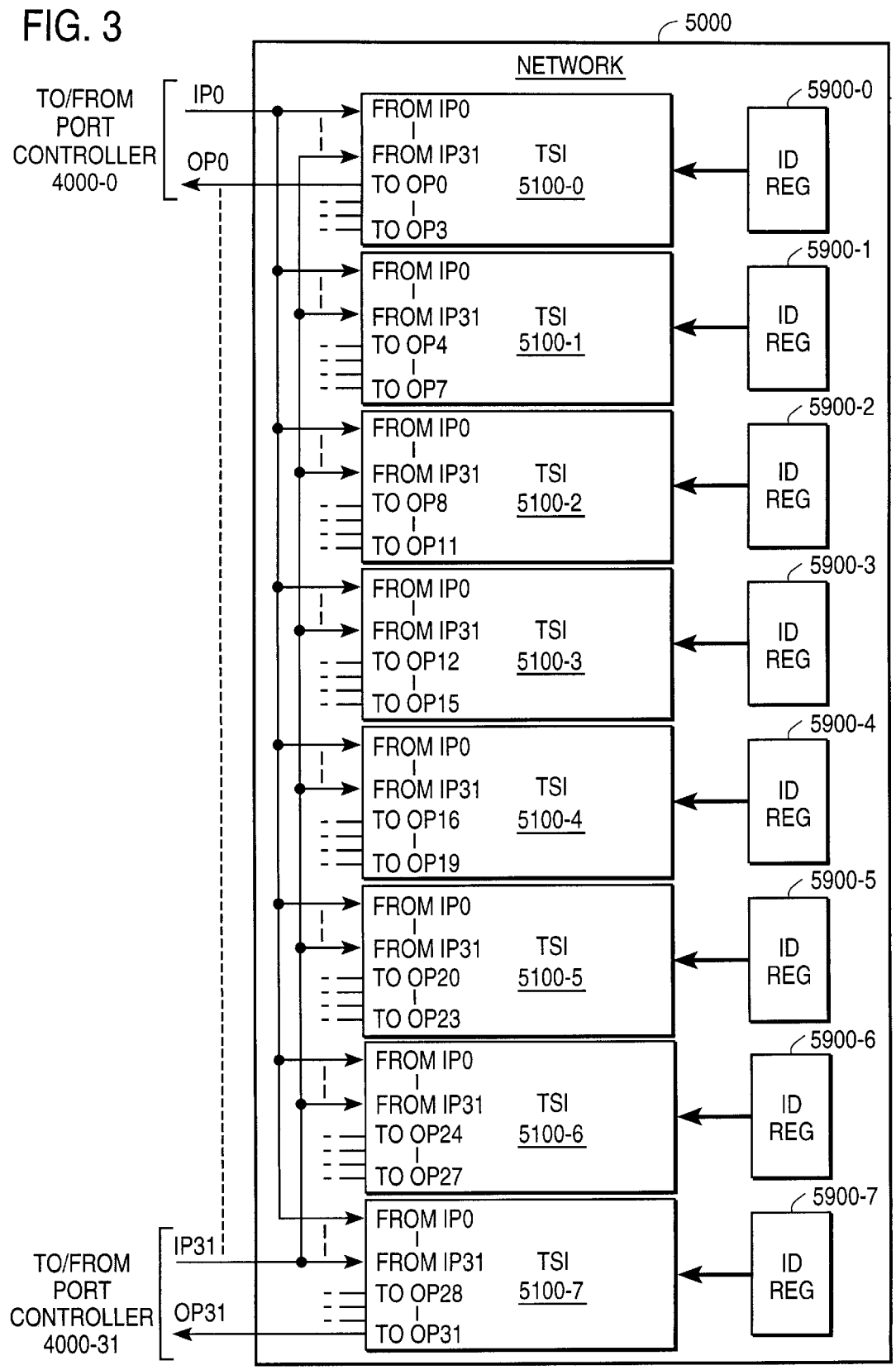
FIG. 3 is a block diagram of a network included in the system of FIG. 1.
Figure 5:
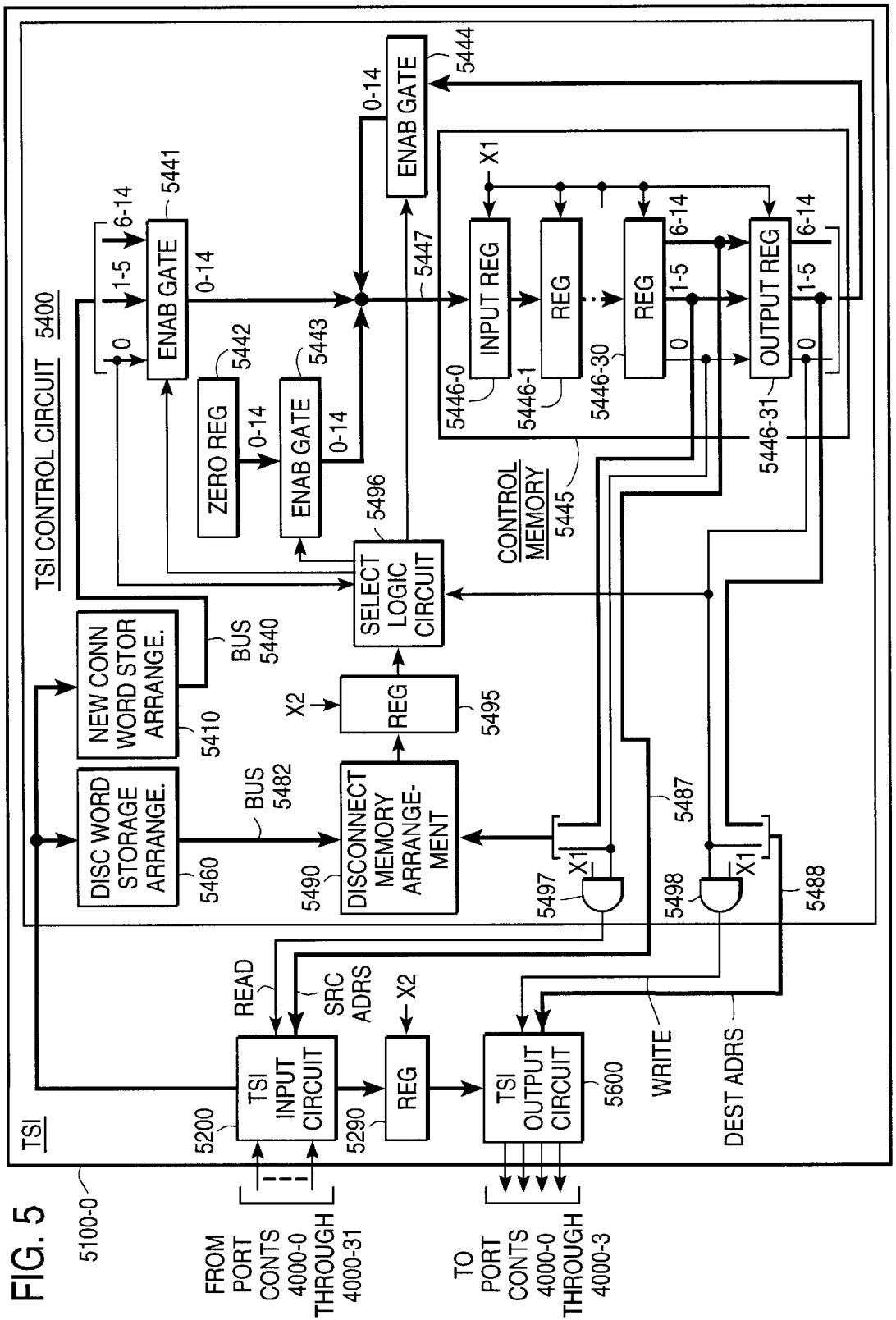
FIG. 5 is a block diagram of a time slot interchanger according to an embodiment of the present invention.

Network 5000 includes eight time-slot interchangers 5100-0 through 5100-7 (FIG. 3). Each time-slot interchanger receives information from all 32 network 5000 input ports IP0 through IP31 but transmits information to only four of the 32 network 5000 output ports OP0 through OP31. Accordingly, a given time-slot interchanger, e.g., 5100-0, receives 256 digital words during a given frame (eight digital words from each of the port controllers 4000-0 through 4000-31) but is required to transmit only 32 digital words (eight digital words to each of the port controllers 4000-0 through 4000-3). A block diagram of time-slot interchanger 5100-0 is shown in FIG. 5. The digital words transmitted by port controllers 4000-0 through 4000-31 are received by a TSI input circuit 5200 including a triple-buffered memory arrangement. Digital words are stored in TSI input circuit 5200 during one frame, during the next frame any of those digital words that are circuit setup request words or circuit disconnect request words are used to appropriately change the contents of a control memory 5445 and then during a third frame up to 32 of those digital words are read from TSI input circuit 5200 and are transmitted via a register 5290 to be written in a TSI output circuit 5600. The reading of TSI input circuit 5200 and the writing of TSI output circuit 5600 are accomplished in accordance with source addresses and destination addresses transmitted from control memory 5445 via paths 5487 and 5488, respectively. TSI output circuit 5600 includes a double-buffered memory arrangement. Accordingly, digital words written into TSI output circuit 5600 during one frame are transmitted to port controllers 4000-0 through 4000-3 during the next frame.

In one embodiment, a given port controller transmits at most one circuit setup request word or circuit disconnect request word to network 5000 during a given frame. Since TSI input circuit 5200 receives information from all 32 of the port controllers 4000-0 through 4000-31, TSI input circuit 5200 receives at most 32 circuit setup request or circuit disconnect request words during one frame. For each circuit setup request word defining a circuit to one of the communications modules 2000-0 through 2000-31 that is received during a given frame, a new connection word is stored in a new connection word storage arrangement 5410. (Recall that time-slot interchanger 5100-0 transmits information to only the 32 communications modules 2000-0 through 2000-31.) Each new connection word stored includes a source address defining the one out of 256 communications modules that has initiated the circuit setup request and a destination address that defines the one out of 32 possible communications modules that is the requested destination. For each circuit disconnect request word defining a circuit to one of the communications modules 2000-0 through 2000-31 that is received during the given frame, a disconnection word is stored in a disconnection word storage arrangement 5460. Each disconnection word defines one of the 32 possible destination communications modules 2000-0 through 2000-31 that is to be disconnected.

During the next frame, the disconnection words stored in arrangement 5460 are used to address a disconnect memory arrangement 5490 having locations associated with each of the 32 communications modules 2000-0 through 2000-31. Logic one signals are stored in each addressed location indicating that the path to the associated communications module is to be disconnected.

Figure 6:
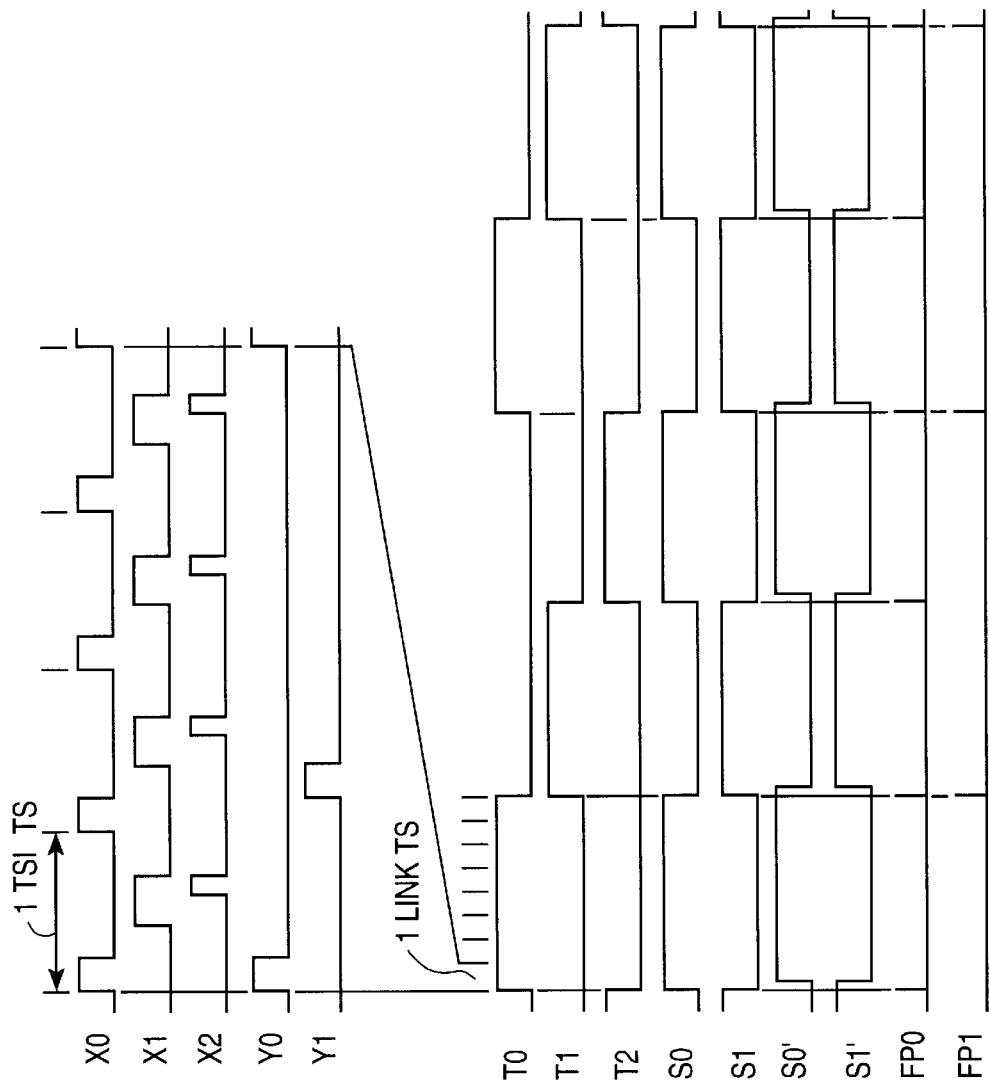
FIG. 6 is a timing diagram relevant to the time slot interchange of FIG. 5.

Control memory 5445 includes 32, fifteen-bit connection word storage registers: an input register 5446-0, 30 intermediate registers 5446-1 through 5446-30 and an output register 5446-31. Thirty-two times during each frame, the contents of the registers 5446-0 through 5446-31 are shifted by one register in response to a clock signal X1 (FIG. 5). Each register 5446-0 through 5446-31 stores one digital word comprising a six-bit destination address (bits 0 through 5) and a nine-bit source address (bits 6 through 14). If a digital word stored in control memory 5445 has a logic one in bits 0 and 6 it is a connection word, i.e., it represents an established connection. Otherwise, it is a null word representing no established connection. For connection words, bits 1 through 5 define one of 32 locations of TSI output circuit 5600 associated with the 32 destination communications modules 2000-0 through 2000-31 and bits 7–14 define one of 256 locations of TSI input circuit 5200 associated with the 256 source communications modules 2000-0 through 2000-255. When a given connection word is stored in register 5446-30 on the clock signal X1, the source address of that connection word is transmitted to TSI input circuit 5200 via path 5487 and the digital word stored in the TSI input circuit 5200 location defined by that source address is read and stored in register 5290 on a clock signal X2 (FIG. 6). When the given connection word is then shifted to output register 5446-31 on the next clock signal X1, the destination address of that connection word is transmitted to TSI output circuit 5600 via path 5488 and the digital word stored in register 5290 is written into TSI output circuit 5600 at the location defined by that destination address. Since TSI output circuit 5600 includes a double-buffered memory arrangement, digital words written into TSI output circuit 5600 during one frame are not transmitted until the following frame and the sequential order in which transfers from TSI input circuit 5200 to TSI output circuit 5600 occur is unimportant. Accordingly, connection words may be stored in any sequential order in control memory 5445.

When the given connection word is stored in register 5446-30, the destination address of that connection word is transmitted to disconnect memory arrangement 5490 and the bit stored in the location thus addressed is read and stored in a one-bit disconnect register 5495 on clock signal X2. Therefore, when the given connection word is shifted to output register 5446-31 on the next clock signal X1, the bit present in register 5495 indicates whether the connection represented by the given connection word is to remain connected or to be disconnected during the next frame. The bit stored in register 5495 together with bit 0 of the digital word in output register 5446-31 and bit 0 of a new connection word available on a bus 5440 from new connection word storage arrangement 5410 are the three input signals to a select logic circuit 5496. A logic one in bit 0 of output register 5446-31 indicates that the digital word stored therein is a connection word rather than a null word. A logic one bit stored in register 5495 indicates that the connection represented by the connection word stored in register 5446-31 is to be disconnected during the next frame. A logic one on bit 0 of bus 5440 indicates that there is a new connection word available to be stored in control memory 5445. Select logic circuit 5496 transmits signals to control three enable gates 5443, 5441 and 5444 in accordance with the truth table given in FIG. 5. When a null word is present in output register 5446-31 and bit 0 of bus 5440 indicates that there is a new connection word available to be stored in control memory 5445, i.e., there is a new connection to be established, select logic circuit 5496 transmits a logic one signal to enable gate 5441 and the new connection word is transmitted via enable gate 5441 and a control memory input path 5447 and stored by input register 5446-0 on the next clock signal X1. When bit 0 of bus 5440 indicates that there is no new connection word available, select logic circuit 5496 transmits a logic one signal to enable gate 5443 and a null word comprising all logic zero bits is transmitted via enable gate 5443 from a zero register 5442 and stored by input register 5446-0 on the next clock signal X1. When a connection word rather than a null word is present in output register 5446-31 and the bit in register 5495 indicates that the connection is not to be disconnected, select logic circuit 5496 transmits a logic one signal to enable gate 5444 and the connection word stored in output register 5446-31 is shifted via enable gate 5444 to input register 5446-0 on the next clock signal X1. However, when the bit in register 5495 indicates that the connection is to be disconnected and bit 0 of bus 5440 indicates that there is a new connection word available to be stored in control memory 5445, i.e., there is a new connection to be established, select logic circuit 5496 transmits a logic one signal to enable gate 5441 and the new connection word is transmitted via enable gate 5441 and stored by input register 5446-0 on the next clock signal X1. Finally, when the bit in register 5495 indicates that the connection is to be disconnected but bit 0 of bus 5440 indicates that there is no new connection word available to be stored in control memory 5445, select logic circuit 5496 transmits a logic one signal to enable gate 5443 and a null word comprising all logic zero bits is transmitted via enable gate 5443 from zero register 5442 and stored by input register 5446-0 on the next clock signal X1.

Control memory 5445 is a sequential access memory rather than a random access memory and is in effect a circulating, multiple-bit shift register wherein the information to be transmitted to input register 5446-0 via control memory input path 5447 is selected by select logic circuit 5496. In the present exemplary embodiment, each connection word (or null word) received on control memory input path 5447 is stored in control memory 5445 for one frame. Since the transmission of source and destination addresses from control memory 5445 to control the transfer of digital words from TSI input circuit 5200 to TSI output circuit 5600 occurs substantially simultaneously with the transmission of connection words (or null words) for storage in input register 5446-0, digital words are transferred at a relatively higher rate in time-slot interchanger 5100-0 than in a time-slot interchanger utilizing a random access control memory arrangement of comparable technology but having alternate read and write access. Advantageously, control memory 5445 can disconnect 32 active connections and establish 32 new connections within any given frame.

Figure 4:
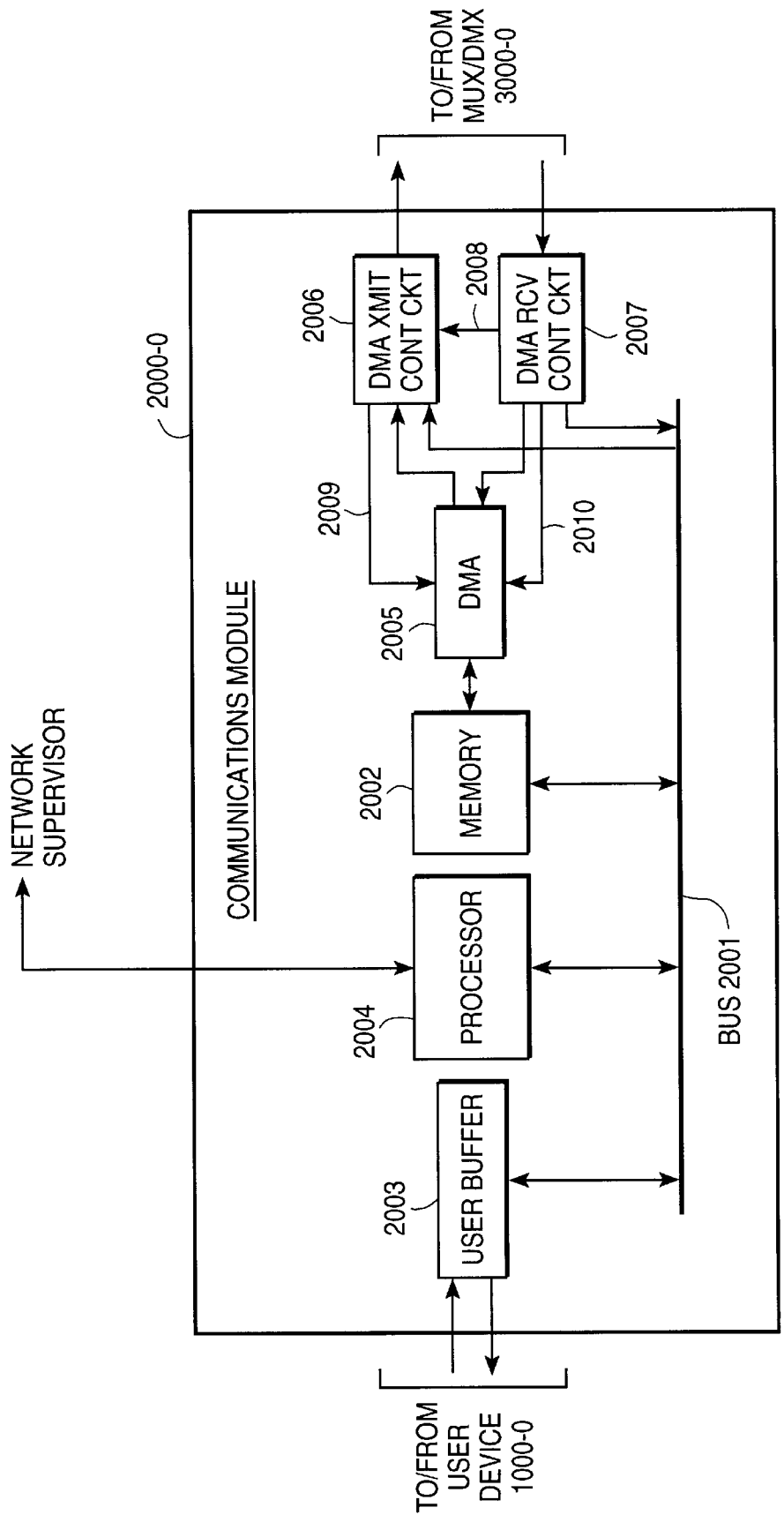
FIG. 4 is a block diagram of a communication module included in the system of FIG. 1.

Communications module 2000-0 (FIG. 4) includes a user buffer 2003 for storing data for communication with user device 1000-0, a processor 2004 and a memory 2002 interconnected by a bus 2001. Information in memory 2002 is conveyed to multiplexer/demultiplexer 3000-0 via a direct memory access device 2005 and a DMA transmit control circuit 2006. Information from multiplexer/demultiplexer 3000-0 is conveyed to memory 2002 via a DMA receive control circuit 2007 and direct memory access device 2005.

As an example, consider that processor 2004 determines that a given block of data, e.g., 100 eight-bit bytes, received from user device 1000-0 via user buffer 2003 and stored in memory 2002 is to be transmitted to user device 1000-248. Processor 2004 additionally provides this information to the network supervisor 100. Processor 2004 transmits a START command via bus 2001 to DMA transmit control circuit 2006, which command indicates that the data is to be transmitted to destination channel 0 of link 3002-31 for communication via communications module 2000-248 to user device 1000-248. Processor 2004 also notifies DMA transmit control circuit 2006 of the size of the data block. Circuit 2006 has four operating states: READY, START, TRANSFER and DISCONNECT. Assuming that circuit 2006 is in the READY state, i.e., it is not involved in transmitting other data, it changes to the SETUP state in response to the START command and transmits a given circuit setup request word defining channel 0 of link 3002-31 as the requested destination. The given circuit setup request word is transmitted by multiplexer/demultiplexer 3000-0 in source channel 0 of link 3001-0 to port controller 4000-0. Until DMA receive control circuit 2007 receives a circuit set response from port controller 4000-0 in destination channel 0 of link 3002-0 and informs circuit 2006 thereof via a path 2008, circuit 2006 remains in the SETUP state. In other words, when DMA receive control circuit 2007 receives either no response or destination busy responses in destination channel 0 of link 3002-0, DMA transmit control circuit 2007 remains in the SETUP state and repetitively transmits the given circuit setup request word in source channel 0 of link 3001-0. Upon being informed by circuit 2007 via path 2008 of the receipt of a circuit set response, circuit 2006 changes to the TRANSFER state and transmits a signal via a path 2009 to direct memory access device 2005 which, in response to the signal, begins reading the data block in memory 2002 and transmitting that data via multiplexer/demultiplexer 3000-0 in source channel 0 of link 3001-0 at the rate of two bytes, i.e., 16 bits, per frame.

Recall that processor 2004 notified circuit 2006 of the length of the data block in memory 2002. When the entire block has been transmitted, circuit 2006 changes to the DISCONNECT state and transmits a circuit disconnect request word again defining destination channel 0 of link 3002-31. The circuit disconnect request word is transmitted in source channel 0 of link 3001-0 to port controller 4000-0. When circuit 2007 receives a circuit disconnected response in destination channel 0 of link 3002-0 and notifies circuit 2006 via path 2008, circuit 2006 returns to the READY state where it is available to transmit another data block.

Alternatively, if the connection is indicated to be droppable, processor 2004 may receive a disconnect command from network supervisor 100. In this case, a circuit disconnect word is transmitted and the connection is interrupted.

DMA transmit control circuit 2006 is also used to inform port controller 4000-0 that communications module 2000-0 is available to receive data on destination channel 0 of link 3002-0. When processor 2004 determines that circuit 2007 and direct memory access device 2005 are prepared to transfer incoming data from link 3002-0 to memory 2002 for storage therein, processor 2004 so notifies circuit 2006 which transmits logic one receiver status bits (bit 0, FIG. 2*a*) in source channel 0 of link 3001-0 thereby informing port controller 4000-0 that communications module 2000-0 is ready to receive data from destination channel 0 of link 3002-0. In response, port controller 4000-0 modifies status word 0 defining the availability of communications module 2000-0 to receive data, the next time that status word 0 is cycled to port controller 4000-0.

DMA receive control circuit 2007, in addition to detecting circuit set, circuit disconnected and destination busy responses in destination channel 0 of link 3002-0 and notifying circuit 2006 thereof via path 2008 as described above, detects the START RECEIVING DATA and STOP RECEIVING DATA commands (FIG. 2*b*) with regard to the transmission of data to communications module 2000-0 from another communications module of the system. When circuit 2007 detects a START RECEIVING DATA command from destination channel 0 of link 3002-0, circuit 2007 notifies direct memory access device 2005 via a path 2010. Circuit 2007 then begins transferring the 16-bit data field of each data word subsequently received in that destination channel, to direct memory access device 2005 for storage in memory 2002. When circuit 2007 subsequently detects a STOP RECEIVING DATA command in that destination channel, circuit 2007 stops transferring data for storage in memory 2002 and notifies processor 2004 and direct memory access device 2005 that a complete data block has been received and stored in memory 2002. In response, processor 2004 initiates the transfer of the data block to user buffer 2003 for communication to user device 1000-0.

Further details regarding an exemplary circuit-switched network in which the system according to the present invention may be embodied are available in U.S. Pat. No. Re 32,900, which is hereby incorporated by reference as if fully set forth herein in its entirety. It is noted, however, that a variety of other circuit-switched networks may be employed. For example, a more centralized system may be employed.

It is further noted that while illustrated as a complete telecommunications system having a network controller, the present invention may be embodied in several or only one switch in a network, without affecting the rest of the network infrastructure. Thus, FIG. 1 is exemplary only. For example, the invention may be embodied in a PBX (private branch exchange), central office (CO), hub, router, or other switch. More particularly, a controller configured to monitor droppable requests may be linked to each communications module 2000-0 through 2000-7 only, rather than all the communications modules.

Figure 7A:
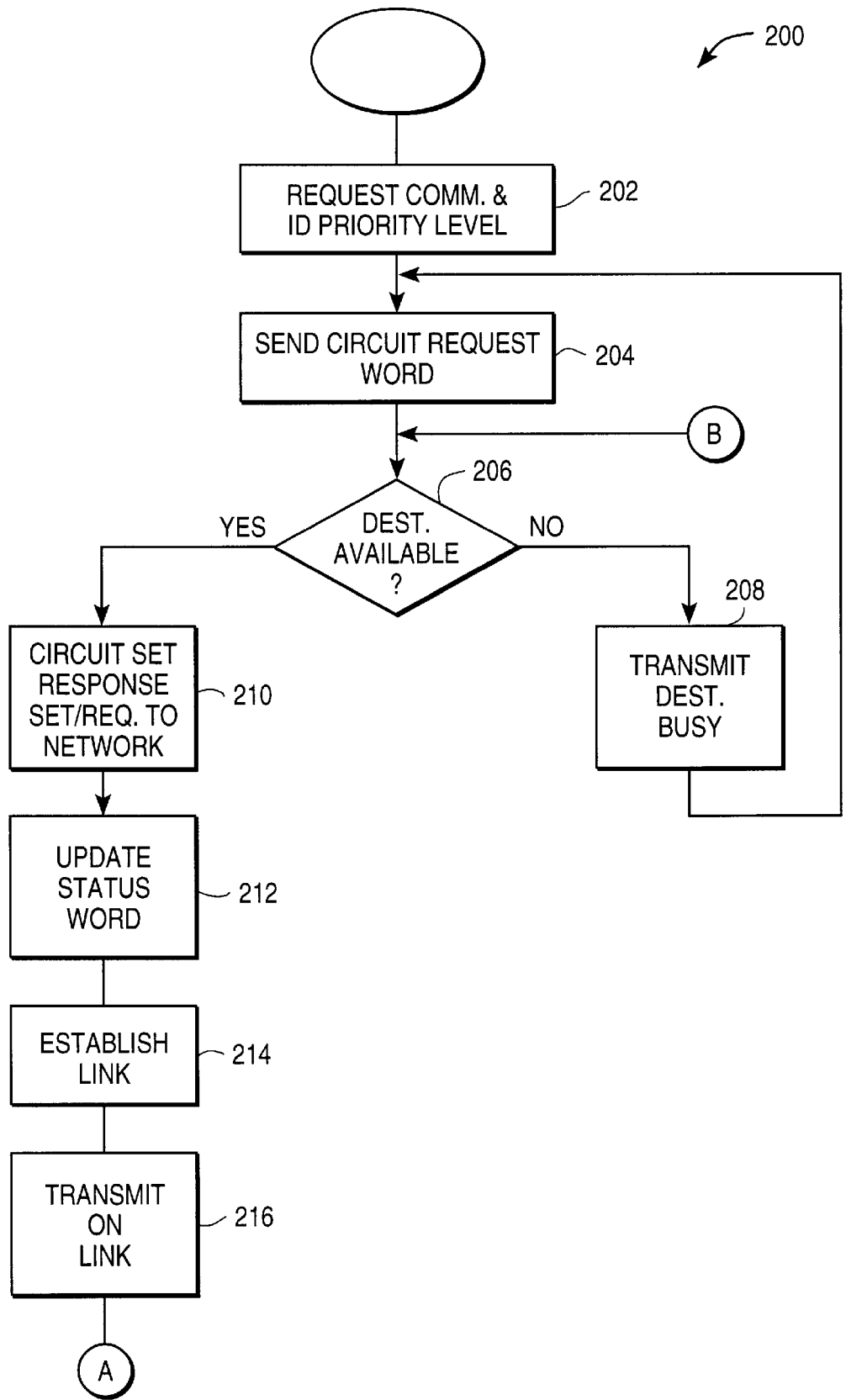
FIGS. 7a and 7b are a flowchart of an embodiment of the present invention.
Figure 7B:
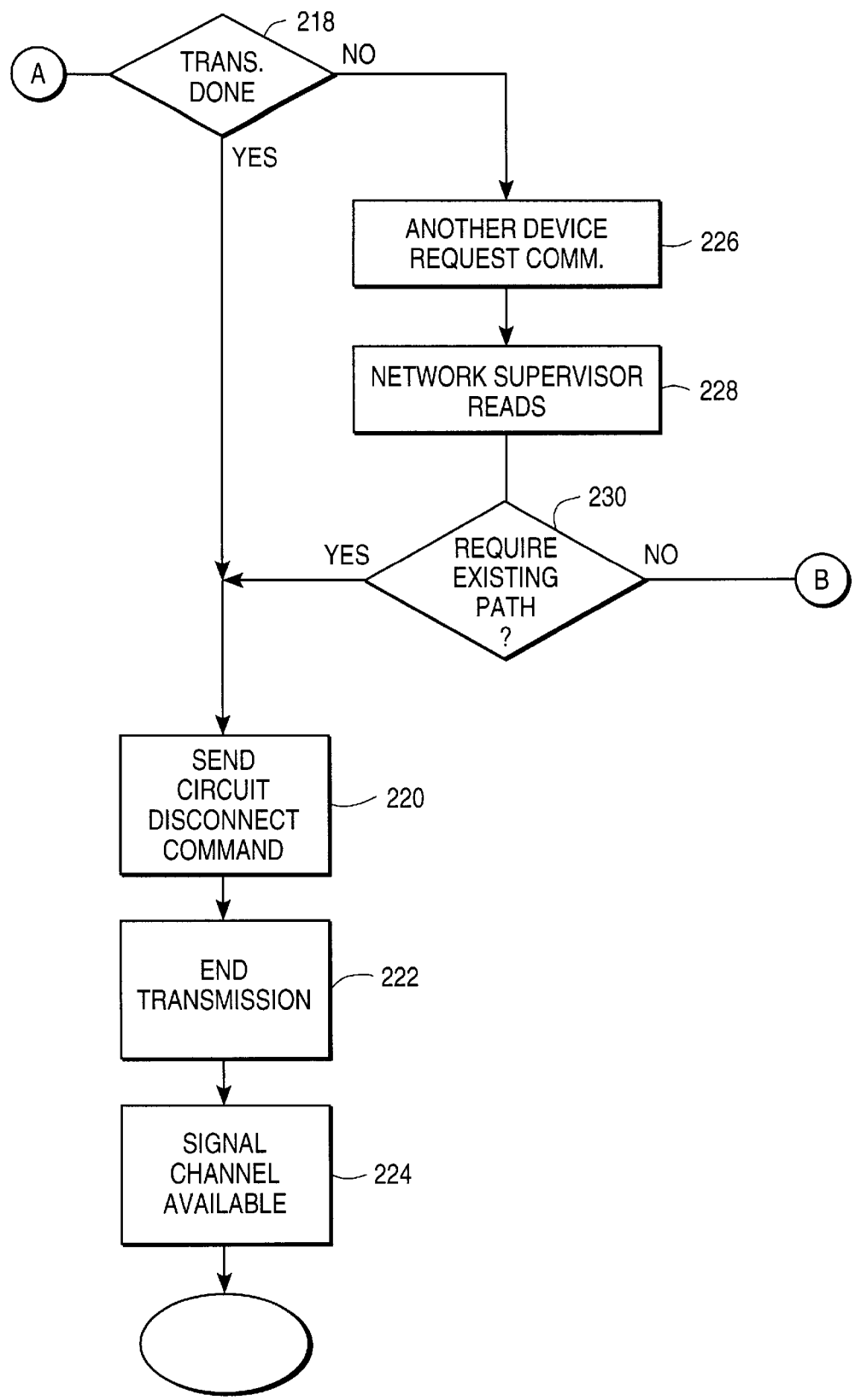

A flowchart illustrating operation of an embodiment of the present invention is illustrated in FIGS. 7*a* and 7*b*. Initially, a user device, for example, 1000-0 wishes to establish a communication with another device, for example 1000-248. The user device 1000-0 provides a communication request to communications module 2000-0 in a step 202. The communication request further includes an identification of a priority level. In response thereto the communications module 2000-0 begins transmitting circuit set up request words defining the destination channel associated with the destination communications module (in this case, module 2000-248) in a step 204. The set up request words are received at the port controller 4000-0 which, as discussed above, compares the set up request word with a plurality of status words to identify whether a particular destination is available in step 206. If the destination is not available the port controller 4000-0 transmits a destination busy response to the requesting communications module 2000-0 which continues to transmit circuit set up request words. If, however, in step 206 the destination was determined to be available the port controller 4000-0 transmits a circuit set response to the requesting communications module and further transmits the stored circuit set up request word to input port IP0 to network 5000 in a step 210. The port controller also updates the corresponding status word to define the destination module and channel as unavailable in a step 212. The network 5000 establishes a communication path via the network output port OP31 and port controller 4000-31 to destination channel 0 of link 3002-31 and transmits the circuit set up request word and subsequent data words thereon in a step 214. The port controller 4000-31 responds with the start receiving data command and transmission on the link begins in a step 216.

Once the transmission is completed, in a step 218, the sending communications module 2000-0 transmits circuit disconnect request words defining the destination channel to the port controller 4000-0 in a step 220. The port controller 4000-0 responds by modifying the status word of the destination channel as being available and transmits a circuit disconnected response to the communications module 2000-0 as well as transmitting the stored circuit disconnect request word onto input port IP0 of network 5000. Network 5000 deallocates the path after conveying the circuit disconnect request to the port controller 4000-31 in a step 222. The port controller 4000-31 responds by transmitting a stop receiving data command to the communications module 2000-248 and which then transmits a command to port controller 4000-31 that it is available to receive data.

Back in step 218, while transmission between user device 1000-0 and user device 1000-248 is ongoing another device may request communication in a step 226. As with all communication requests, this includes identifying a destination and a priority level. Again, the priority level is provided to the network supervisor 100. The communications module receives the request and conveys it to the network supervisor 100 in a step 228. If the network supervisor 100 determines that an existing path is not required, in a step 230 establishment of the communication path or channel proceeds as described above. However, if an existing path is determined to be required, network supervisor 100 causes communication module 2000-0 to transmit a circuit disconnect command. The circuit channel is then disconnected and made available for other use in the manner described above. Thus, the sending communications module 2000-0 transmits circuit disconnect request words defining the destination channel to the port controller 4000-0 in a step 220. The port controller 4000-0 responds by modifying the status word of the destination channel as being available and transmits a circuit disconnected response to the communications module 2000-0 as well as transmitting the stored circuit disconnect request word onto input port IP0 of network 5000. Network 5000 deallocates the path after conveying the circuit disconnect request to the port controller 4000-31 in a step 222. The port controller 4000-31 responds by transmitting a stop receiving data command to the communications module 2000-248 and which then transmits a command to port controller 4000-31 that it is available to receive data. It is noted that, depending on system bandwidth and how much longer the message is, the disconnect request prior to step 220 may be held until the message is completed.

The invention described in the above detailed description is not intended to be limited to the specific form set forth herein, but on the contrary, it is intended to cover such alternatives, modifications and equivalents as can reasonably be included with the spirit and scope of the appended claims.

We claim:

1. A network system, comprising:

means for establishing a circuit-switched connection from a first node to a second node;

means operatively coupled to said establishing means for monitoring traffic in the network;

means responsive to said monitoring means for dropping said circuit-switched connection responsive to a level of traffic in the network;

means for identifying said circuit-switched connection as having one or more priority levels;

wherein said dropping means is configured to drop said circuit-switched connection responsive to a first level of traffic in the network if said circuit-switched connection has a first predetermined priority level; and wherein said dropping means includes means for permitting predetermined data on a low priority circuit-switched connection to be transmitted before dropping said circuit-switched connection.

2. A communication system, comprising:

a first user device configured to request communication with a second user device, wherein said request identifies a predetermined priority level;

a switching system configured to provide a first circuit-switched connection between said first device and said second device responsive to said communication request; and a controller configured to drop said communication responsive to a second communication request that would require a predetermined portion of a circuit path being used by said first circuit-switched connection.

3. The communication system of claim 2, wherein said controller is configured to drop said communication if said second communication request has a higher priority than said first communication request.

4. The communication system of claim 3, wherein said controller is configured to allow a predetermined portion of said communication to proceed prior to dropping said communication.

5. The communication system of claim 2, wherein said controller is configured to prevent establishment of a circuit-switched connection if a request corresponding to said connection identifies said connection as having a predetermined priority and a level of traffic in the network exceeds a predetermined threshold.

6. A method for communicating in a network system, comprising:

establishing a circuit-switched connection from a first node to a second node, said circuit-switched connection having a first predetermined priority level;

monitoring traffic in the network; and dropping said circuit-switched connection responsive to a request to establish a second circuit-switched connection that would require at least a portion of a network path of said first circuit-switched connection if said second circuit-switched connection has a higher priority than said first circuit-switched connection.

7. A method according to claim 6, wherein said establishing comprises providing a channel identifier and a priority level identifier.

8. A method according to claim 6, wherein said dropping further comprises permitting a predetermined portion of the data being transmitted during said circuit-switched connection to be transmitted prior to dropping said circuit-switched connection.

9. A method according to claim 6, further comprising preventing a circuit-switched connection from being made if said circuit-switched connection has a predetermined low priority level and a level of traffic in the network exceeds a predetermined threshold.

10. A controller in a network system, comprising:

a processor configured to monitor priority levels for circuit-switched connections; and a memory unit configured to store information concerning existing circuit-switched connections;

wherein said processor is configured to control dropping an existing circuit-switched connection responsive to a determination that a subsequent circuit-switched connection has a higher priority and said subsequent circuit-switched connection requires at least a portion of a circuit path of said existing circuit-switched connection.

11. A controller in a network system, comprising:

a processor configured to monitor priority levels for circuit-switched connections; and a memory unit configured to store information concerning existing circuit-switched connections;

wherein said processor is configured to control dropping an existing circuit-switched connection responsive to a determination that a subsequent circuit-switched connection has a higher priority and said processor is further configured to prevent a circuit-switched connection from being made if the circuit-switched connection has a predetermined low priority and the network system has a predetermined level of utilization.

12. A controller according to claim 11, wherein said processor is further configured to permit a predetermined portion of the data of said existing circuit-switched connection to be transmitted prior to dropping said existing circuit-switched connection.

* * * * *